(12) United States Patent
Bernhardt

(10) Patent No.: US 9,909,699 B2
(45) Date of Patent: Mar. 6, 2018

(54) GARDEN HOSE WITH SPIRAL GUARD

(76) Inventor: Jay G. Bernhardt, Liverpool, NY (US)

( * ) Notice: Subject to any disclaimer, the term of this patent is extended or adjusted under 35 U.S.C. 154(b) by 0 days.

(21) Appl. No.: 13/351,274

(22) Filed: Jan. 17, 2012

(65) Prior Publication Data

US 2012/0234424 A1  Sep. 20, 2012

Related U.S. Application Data

(60) Provisional application No. 61/453,741, filed on Mar. 17, 2011.

(51) Int. Cl.
| F16L 11/00 | (2006.01) |
| F16L 33/22 | (2006.01) |
| F16L 11/08 | (2006.01) |

(52) U.S. Cl.
CPC ........... *F16L 33/223* (2013.01); *F16L 11/088* (2013.01)

(58) Field of Classification Search
USPC .......... 138/122, 125, 126, 109, 110
See application file for complete search history.

(56) References Cited

U.S. PATENT DOCUMENTS

| 1,977,775 | A | * | 10/1934 | Patterson | 138/110 |
| 2,121,624 | A | * | 6/1938 | Cowles | 285/256 |
| 2,160,240 | A | * | 5/1939 | Wallace et al. | 138/110 |
| 2,185,741 | A | * | 1/1940 | Sorg et al. | 285/115 |
| 2,901,024 | A | * | 8/1959 | Marsden, Jr. | 156/143 |
| 3,047,026 | A |  | 7/1962 | Kahn |  |
| 3,073,353 | A | * | 1/1963 | Rittenhouse | 138/148 |
| 4,140,154 | A | * | 2/1979 | Kanao | 138/132 |
| 4,238,260 | A | * | 12/1980 | Washkewicz | 156/149 |
| 4,275,769 | A | * | 6/1981 | Cooke | 138/109 |
| 4,490,575 | A | * | 12/1984 | Kutnyak | 174/47 |
| 4,599,784 | A | * | 7/1986 | Canu et al. | 29/450 |
| 4,923,223 | A | * | 5/1990 | Seckel | F16L 11/04 138/109 |
| 5,899,237 | A | * | 5/1999 | Akedo et al. | 138/129 |
| 5,975,144 | A | * | 11/1999 | Akedo et al. | 138/129 |
| 6,000,435 | A | * | 12/1999 | Patel et al. | 138/122 |
| 6,308,741 | B1 | * | 10/2001 | Payne | 138/110 |
| 6,367,510 | B1 | * | 4/2002 | Carlson | 138/121 |
| 6,827,109 | B2 | * | 12/2004 | McCaughtry | 138/134 |
| 6,830,076 | B1 | * | 12/2004 | Patel | 138/110 |
| 6,907,906 | B1 | * | 6/2005 | Cook et al. | 138/109 |
| 6,955,189 | B1 | * | 10/2005 | Weyker | F16L 11/121 138/104 |
| 6,971,414 | B2 | * | 12/2005 | Vohrer | 138/109 |
| 7,658,208 | B2 |  | 2/2010 | Burrowes et al. |  |
| 8,056,584 | B2 |  | 11/2011 | Burrowes et al. |  |
| 8,752,591 | B2 | * | 6/2014 | Montalvo | F16L 11/082 138/121 |
| 8,936,047 | B2 | * | 1/2015 | Hahn et al. | 138/121 |

(Continued)

*Primary Examiner* — James Hook
(74) *Attorney, Agent, or Firm* — Bernhard P. Molldrem, Jr.

(57) ABSTRACT

An improved hose has a TPE cover layer disposed radially over an inner tube layer and reinforcing braid layer. A D-profile spiral guard is disposed atop the cover layer with a flat side of the D profile facing the cover layer. Hose connectors or end couplings are designed to be tough and durable, and not crush and deform in rough use. The hose end couplings are each retained with an external ferrule having internal spiral lands and grooves so that the spirals of the ferrule follow the spiral guard, to form an interference fit on the cover layer and spiral guard of the hose.

17 Claims, 2 Drawing Sheets

(56) References Cited

U.S. PATENT DOCUMENTS

| | | | |
|---|---|---|---|
| 2002/0003003 A1* | 1/2002 | Hayashi et al. | 138/127 |
| 2006/0151043 A1* | 7/2006 | Nanney | B32B 1/08 |
| | | | 138/125 |
| 2006/0165829 A1* | 7/2006 | Smith et al. | 425/113 |
| 2010/0071795 A1 | 3/2010 | Montalvo et al. | |
| 2011/0303317 A1* | 12/2011 | Montalvo et al. | 138/129 |
| 2013/0284302 A1* | 10/2013 | Castro | F16L 11/111 |
| | | | 138/109 |
| 2014/0053939 A1* | 2/2014 | Kaye | A61M 39/12 |
| | | | 138/109 |

\* cited by examiner

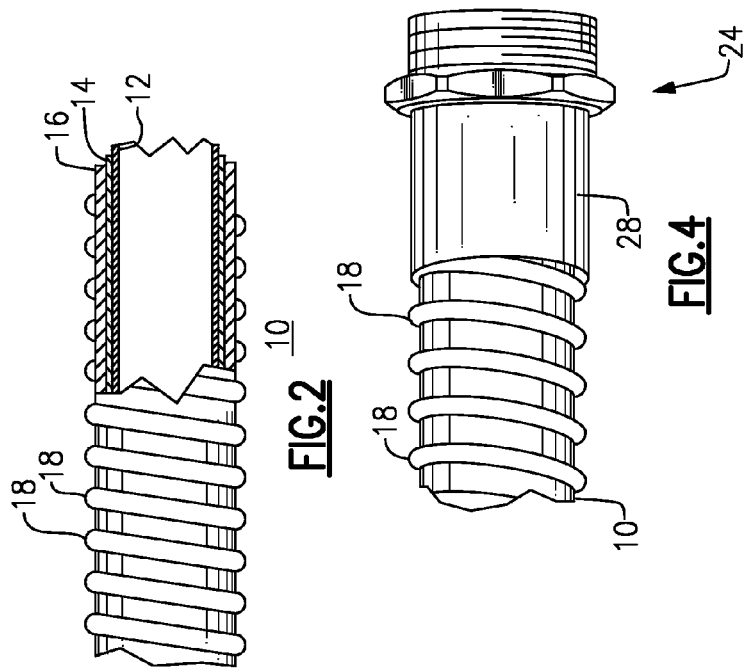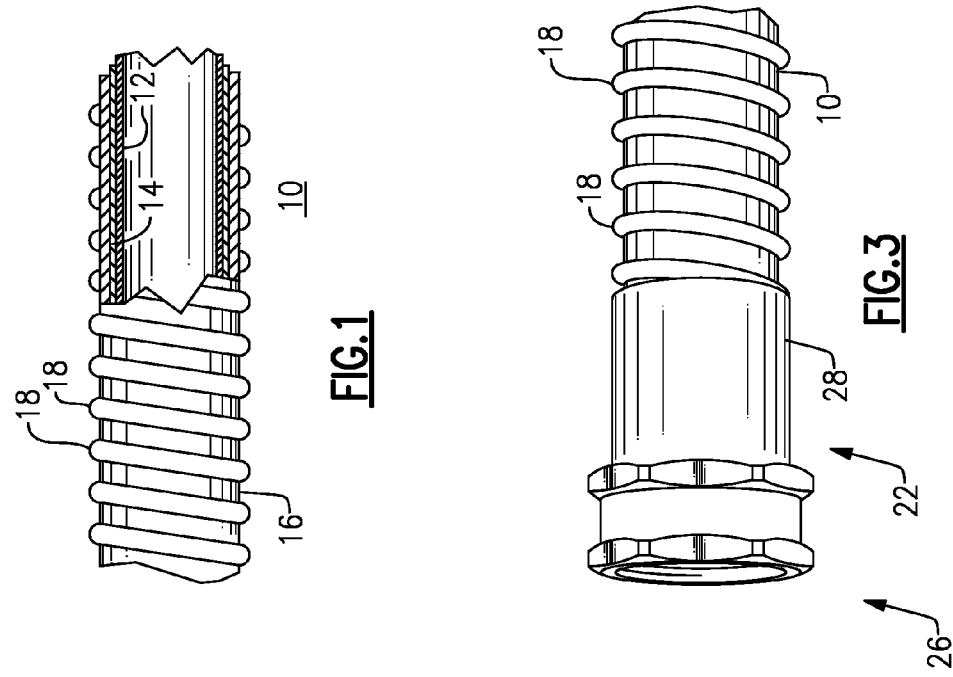

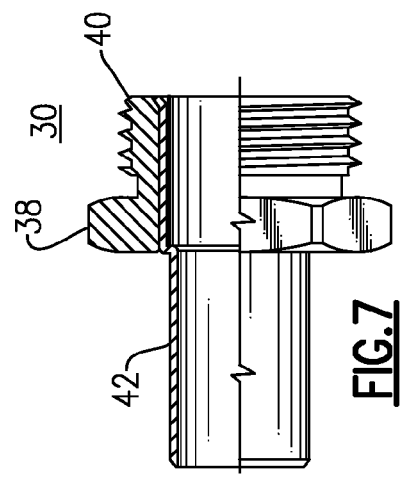
FIG. 7
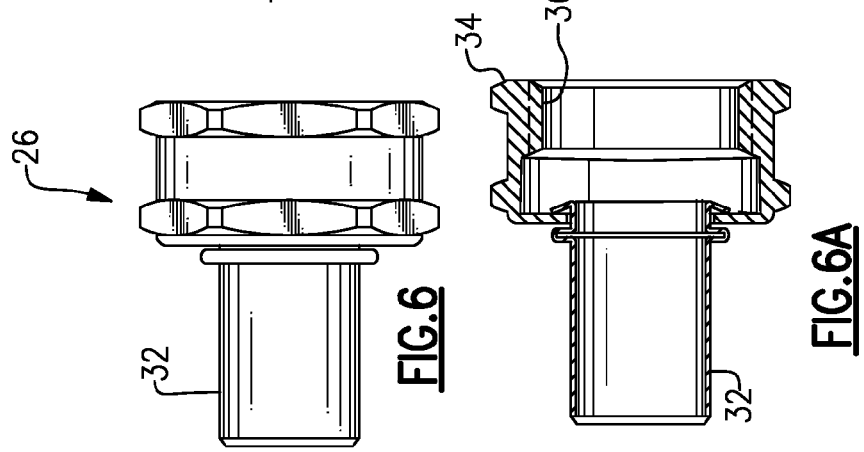
FIG. 6
FIG. 6A
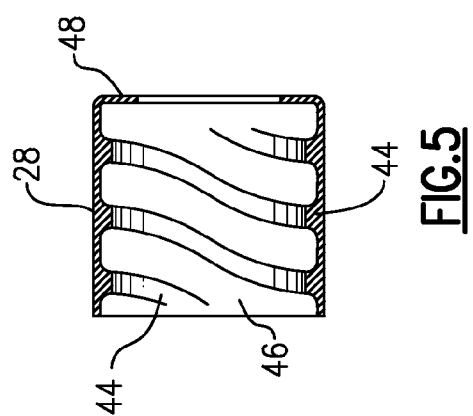
FIG. 5

GARDEN HOSE WITH SPIRAL GUARD

Priority is claimed of provisional application Ser. No. 61/453,741, Mar. 17, 2011, and which is incorporated herein by reference.

BACKGROUND OF THE INVENTION

This invention is directed to garden hoses and other water hoses that may be used for carrying water under pressure, for home, commercial or industrial use, including gardening, washing, or spraying of articles or surfaces.

The object of the present invention is to provide a water hose with a spiral guard strip, i.e., an outer coil, with the hose having characteristics of kink resistance, burst resistance, abrasion resistance, high flow rate in use so that it can be used for washing or rinsing vehicles or pavement if need be, and sufficient flexibility so that it can be easily wound up by hand onto a hose reel.

The hose needs to satisfy a target flow rate of 3.2 gallons per minute or better for use in washing a vehicle, and if possible to satisfy a flow rate of 5.2 gallons per minute (minimum) for washing pavement. The hose must pass a burst test at 150 psi or higher, i.e., without delaminating or undue stretching. Also, the hose must have sufficient crush resistance for a commercial vehicle to drive over it without damaging the hose. Also, the hose has to be durable and resistant to scuffing, scratching, or cutting when dragged over rough pavement, and must be flexible enough so that it can be pulled around stationary objects.

There have been previous attempts to make a hose more resistant to kink, crush and burst by incorporating a spiral or helical reinforcement strip into the outer tubular layer of the hose. This construction has made the hose unduly stiff in some cases because the embedded helix lacks the ability to flex freely. Also this construction has required a reduction in the inner tubular layers. Moreover, the outer cover layer is unprotected from scratching and abrasion when the hose is dragged. In addition, the prior art hoses have made no special effort to improve the end connectors and they remain prone to crushing. Also, the end connectors conventionally used in these hoses create a narrowing restriction at the ends of the hose which can restrict water flow.

OBJECTS AND SUMMARY OF THE INVENTION

It is an important object of the present invention to provide a water hose that is lightweight, flexible, and durable, and incorporates the properties of being crush-resistant, kink-resistant and burst-resistant.

It is a further object to provide a water hose or garden hose with a spiral outer guard that prevents damage from abrasion and scratching.

A still further object is to provide a water hose or garden hose with male and female end connectors which are themselves resistant to crushing or similar mechanical damage.

Another important object is to make the garden hose or water hose of a simple yet practical construction so that it is sturdy and durable but also light weight and flexible.

According to an aspect of this invention, an elongated flexible water hose comprises an inner tube layer, a cover layer disposed radially over the inner tube layer, and a reinforcing braid layer disposed between those layers, although alternatively the braid layer may be within the inner tube layer. A spiral guard is disposed atop the cover layer. The spiral guard is a tough plastic resin strip having a D profile, and is wound in a spiral so that a flat side of the D profile faces against the cover layer. Preferably, the D profile of the spiral guard has a width along the axial direction of the hose of substantially 0.135 inches and a height in the radial direction of the hose of substantially 0.130 inches, and there is a space between turns of substantially 0.170 inches. Favorably, the spiral guard is formed of a two inter-spaced spiral starts. The spiral guard may be formed of a PVC or as a polypropylene spiral wear strip. Most preferably, the spiral guard is adhered to but not embedded in the cover layer.

In a preferred embodiment, the cover layer is formed of a suitable thermoplastic elastomer (TPE). The cover layer can have an outer diameter of between 0.96 inches to 1.1 inches, and may have a wall thickness of substantially 0.01675 inches and up to about 0.025 inches.

The male and female hose connectors or end couplings are designed to be tough and durable, so they do not crush and deform even in rough use. These will resist deformation even if driven over with a commercial vehicle. The hose end couplings are each formed with an external ferrule, preferably of brass, that has internal spiral lands and grooves so that the spirals of the ferrule follow the spiral guard, and fit against the hose end to form an interference fit on the cover layer and spiral guard of the hose. The ferrule favorably has a wall thickness, along the spiral lands, of substantially 0.075 to 0.085 inches.

Each of the end couplings also has a standard-thread male or female fitting and a tubular brass insert that fits inside the inner tube at the hose end. In order to achieve maximal flow, the tubular brass insert has an internal diameter of greater than 0.5 inches. The insert wall thickness may be on the order of substantially 0.02 inches.

The spiral guards can be made with an included pigment so that the hoses may be provided in a variety of colors. In some possible embodiments, the hoses may be color coded as to hose length, or may be provided in different colors for different functions, e.g., lawn watering, automobile washing, etc.

The hose according to the present invention will now be described with reference to a preferred embodiment which is offered as an example, and which is to be considered in connection with the accompanying figures of Drawing.

BRIEF DESCRIPTION OF THE DRAWING

FIGS. 1 and 2 are sectional views of a favorable embodiment of a garden hose or water hose according to the present invention.

FIGS. 3 and 4 are perspective views of end portions thereof showing the female and male threaded hose couplings.

FIG. 5 is a cross sectional view of the ferrule or outer sleeve of the hose coupling.

FIG. 6 is a side view of the female hose connector with tubular insert.

FIG. 6A is a cross sectional view thereof.

FIG. 7 is a cross sectional view of the male hose connector with tubular insert.

DETAILED DESCRIPTION OF A PREFERRED EMBODIMENT

FIGS. 1 and 2 are sectional views of a favorable embodiment of a garden hose that satisfies the objectives of the invention. The hose 10 comprises an inner tube 12 of a synthetic rubber or equivalent, and this is overlaid with a reinforcement braid layer 14, with a cover layer 16 of a synthetic rubber or thermoplastic elastomer. A spiral guard 18 is wound around the radially outer surface of the cover layer 16, and this can be made of a tough resilient plastic such as PVC or polypropylene.

In the preferred mode, as shown in FIG. 2, the hose has an inner diameter of ⅝ inch (0.625"), with the inner tube 12 and cover 16 each having a thickness of up to about 0.025" to 0.030". The braid layer 14 can have similar thickness. In some cases, the braid layer may be radially inside the inner tube layer 12. Hose with ¾ inch (0.75") i.d. is also possible.

In the embodiments of this hose 10, the spiral guard 18 has a "D" profile, so that there is a flat surface facing against the cover layer 16. The spiral guard is on the exterior and is not embedded under the cover layer, as is the practice with other manufacturers of hose. The spiral coil 18 serves as a wear strip and shields the rubber cover 16 of the hose from scuffing and cutting. FIG. 2 shows the dimensions of the D-profile strip that forms the spiral guard 18, including both its radial thickness (0.130") and axial width (0.135") along the hose surface and also its spacing (0.170") between turns. This provides the optimal pitch to achieve both burst resistance and kink resistance, without interfering with the ability to carry sufficient flow of water or the ability of the hose to be wound up onto a reel.

In practice, many competitive hoses with a spiral-wound guard member tend to fail when internal pressure elongates the hose along the hose longitudinal axis. This increases the spacing between the turns of the helical coil, and allows the inner tube member to blow through. If wall thickness is increased to compensate for this, the ability of the hose to resist kinking is affected. Excessive thickness or stiffness in the hose, specifically in the inner tube/reinforcement braid/friction layers can cause the delamination. This problem has been overlooked in prior art hoses.

The hose of this invention recognizes that the structural integrity of the hose is dependant upon the bonding together of the components, including the facing surfaces of the guard coil 18 and the cover 16. In this invention, with the D-section strip for the spiral guard coil 18, and with its flat side facing radially inward and against the cover layer 16, the bonding strength is greatly increased. This also shortens the inter-turn spacing, limiting the "blow through" distance. Also, the hose of this invention addresses the problem that arises because the surface bonds are subjected to combined loading (i.e., both bending moments and shear moments). The bending moment can be reduced by moving the helix radially inward, i.e., closer to the inner tube 12. In this invention, any friction layer or adhesive layer is omitted or limited in thickness, which also reduces bonding stress. The construction of these embodiments recognizes that flexibility is as important as strength, and thus the radial thickness is kept minimal, which improves durability and performance.

In addition, with fewer component parts or layers, the hose of this invention is easier and less expensive to manufacture than competitive hoses, as well as having increased durability.

Tests show that a fifty-foot hose according to an embodiment of this invention, i.e., as shown in FIG. 1, can deliver a flow of 9.8 g.p.m. while coiled on a reel, and 10.1 g.p.m. when unreeled and straight. The hose was able to sustain having a vehicle run over it several times without damage, and passed drag (abrasion) tests and pull strength (axial stress) tests without noticeable damage.

The above-described hose(s) represent examples of how this invention may be implemented. Many other materials or configurations of the hose construction are possible within the main principles of the invention.

There are female and male end connectors or hose couplings 22 and 24, respectively, as shown generally in FIGS. 3 and 4. Each of these has a respective threaded connector, i.e., a female threaded connector 26 with internal threads (FIG. 3) and a male threaded connector 30 with external threads (FIG. 4), and each is secured to the end of the hose 10 by means of a sturdy ferrule 28. The ferrule is provided with a spiral arrangement of internal lands and grooves so that it secures over the structure of the hose, i.e., forms an interference fit onto the cover 16 and spiral wear guard 18 of the hose.

The female threaded connector 26 is shown in FIGS. 6 and 6A, including an outer nut portion 34 with eight flat sides to allow for tightening with a wrench or similar tool, and with an internal female thread 36. A tubular insert 32 fits into the end of the hose 10 against the inner tube 12 of the hose, and this is secured when the ferrule 28 is in place. The insert 32 has first and second radial flanges at its proximal end for engaging an inward flange of the nut portion 34, and permitting relative rotation. A hose washer (not shown here) is retained within the void of the nut portion behind the female thread. The corresponding male threaded connector 30 has a nut portion 38 with similar eight flat sides, and a male threaded portion 40. The male connector also has an associated tubular insert 42 that fits into the other end of the hose 10 and is secured by the outer ferrule 28. The threaded portions 36 and 40 are of a standard size and thread so as to fit one another and also fit other standard threaded hose connectors, nozzles, and hose outlets or spigots. In each case, the tubular insert 32 or 42 is a fairly thin wall construction, being brass and with an inner diameter of 0.55 to 0.60 inches or greater, and an outer diameter of about 0.62 to 0.65 inches. The strength and rigidity is provided by the external ferrule 28, as shown in FIG. 5, which is of solid, i.e., unitary one-piece construction, and which is of sufficient thickness to be crush-proof and non-deformable under the expected forces of daily use.

As shown in FIG. 5, The ferrule 28 has a smooth, cylindrical outer wall surface, but has a double-pitch left hand thread on its interior, formed of spiral lands 44 separated by spiral grooves 46. An end flange 48 fits as a stop onto the end of the hose, and has a central opening of sufficient size to accommodate the associated tubular insert 32 or 42 of the associated end connector. The lands 44 define an interior diameter of 0.88 inches, while the grooves define an interior diameter of 0.99 inches. This results in the lands 44 making an interference fit onto the hose cover layer 16 in the areas between turns of the spiral wear guard 18, while the walls of the grooves 46 form an interference fit with the outer portions of the wear guard 18. The wall thickness of the brass ferrule at the lands 44 is about 0.085 inches, which provides excellent resistance to crushing and stands up well to dragging or scraping. While brass is preferred, other strong metals could be used, and some modern synthetic resin plastics may be suitable for applications where a non-conductive or non-metal material is needed.

While the invention has been described with reference to a preferred embodiment, it should be understood that many modifications and variations are possible without departure from the scope and spirit of the invention, as defined in the appended claims.

I claim:

1. An elongated flexible garden hose configured for home, commercial or industrial use including gardening, washing or spraying of articles and surfaces, having an inner diameter of between ⅝ inch and ¾ inch, and being adapted for carrying water under pressure, and which is crush-resistant when a vehicle is driven over it, kink-proof, abrasion resistant, and burst-resistant at pressures of 150 psi and achieving a flow rate of 5.2 gallons per minute or greater, and sufficiently flexible so that it can be pulled around stationary objects; the garden hose comprising a seamless inner tube layer formed of synthetic rubber and having an inner diameter limited to ⅝ to ¾ inch, a continuous seamless tubular cover layer disposed radially over the inner tube layer and formed of a continuous seamless tubular extrusion of thermoplastic elastomer, a reinforcing braid layer situated, with an absence of adhesive, immediately between the inner tube layer and the cover layer, and a spiral guard disposed atop the cover layer, the spiral guard being formed of a tough plastic resin strip free of metal wire, and wound in a spiral formed of one or more spiral starts and so that the plastic resin strip spiral guard has an inward surface that faces directly against the cover layer; and wherein said inward surface of said spiral guard is adhered to and not embedded in said cover layer.

2. The hose of claim 1 wherein said spiral guard has a space between turns of substantially 0.170 inches.

3. The hose of claim 1 wherein said spiral guard is formed of a pair of interspaced PVC wearstrips.

4. The hose of claim 1 wherein said spiral guard is formed as a pair of interspaced polypropylene spiral wearstrips.

5. The hose of claim 1 wherein said cover layer has an outer diameter of between 0.96 inches to 1.1 inches.

6. The hose of claim 1 wherein said cover layer has a thickness between substantially 0.01675 inches and 0.025 inches.

7. The hose of claim 1 wherein there is an absence of an adhesive layer between the inner tube layer and the braid layer, and between the braid layer and the cover layer.

8. The hose of claim 1 wherein said spiral guard has a D profile, and said surface of the spiral guard that faces against the cover layer is a flat side of the D profile.

9. The hose of claim 8 wherein said D profile has a width along the axial direction of the hose of substantially 0.135 inches and a height in the radial direction of the hose of substantially 0.130 inches.

10. The hose of claim 1 wherein said spiral guard extends the length of the hose to ends thereof.

11. An elongated flexible garden hose configured for home, commercial or industrial use including gardening, washing or spraying of articles and surfaces, having an inner diameter of between ⅝ inch and ¾ inch, and being adapted for carrying water under pressure, and which is crush-resistant when a vehicle is driven over it, kink-proof and burst-resistant at pressures of 150 psi and achieving a flow rate of 5.2 gallons per minute or greater, and sufficiently flexible so that it can be pulled around stationary objects; the garden hose comprising a seamless inner tube layer formed of synthetic rubber and with an inner diameter limited to ⅝ inch to ¾ inch, a cover layer disposed radially over the inner tube layer and formed of a seamless tubular extrusion of a thermoplastic elastomer, a reinforcing braid layer situated immediately between the inner tube layer and the cover layer with an absence of adhesive, and a spiral guard disposed atop the cover layer, the spiral guard being formed of a tough plastic resin strip free of metal wire, and wound in a spiral formed of one or more spiral starts and so that a surface of the plastic resin strip spiral guard faces against the cover layer, the spiral starts extending the length of the hose to ends thereof; and wherein said surface of said spiral guard is adhered to and not embedded in said cover layer; the hose further comprising hose end couplings each formed with an external rigid metal ferrule having internal spiral lands and grooves to form an interference fit onto the cover layer and spiral guard of the hose, said lands and grooves being configured so as to match the one or more spiral starts of said spiral guard, such that the rigid metal ferrules of the hose end couplings are configured to be threaded directly onto said spiral guard of the hose; a threaded fitting, and a tubular brass insert fitting into the end of the hose and urging said cover layer and said spiral wear strips into said interference fit directly with the lands and grooves of said external ferrule.

12. The hose of claim 11 wherein said external ferrule has a wall thickness at said lands of substantially 0.085 inches.

13. The hose of claim 12 wherein said external ferrule is formed of brass.

14. The hose of claim 11 wherein the end couplings each comprise said threaded fitting and said tubular brass insert having an internal diameter of greater than 0.5 inches.

15. The hose of claim 14 wherein said tubular brass insert has a wall thickness of substantially 0.02 inches.

16. The hose of claim 11 wherein said one or more spiral starts consists of a pair of interspaced spiral starts; and said internal spiral lands and grooves of said external metal ferrule are formed as a pair of interspaced spiral lands defining a pair of interspaced spiral grooves.

17. The hose of claim 11 wherein said threaded fitting includes a female threaded outer nut portion having an annular inward flange, and said tubular insert includes first and second radial flanges at a proximal end thereof engaging between them the inward flange of said nut portion and permitting relative rotation between the nut portion and the tubular insert.

* * * * *